United States Patent [19]
Yasutake

[11] Patent Number: 6,051,833
[45] Date of Patent: Apr. 18, 2000

[54] PROBE SCANNING DEVICE

[75] Inventor: Masatoshi Yasutake, Chiba, Japan

[73] Assignee: Seiko Instruments Inc., Japan

[21] Appl. No.: 09/016,450

[22] Filed: Jan. 30, 1998

[51] Int. Cl.[7] .............................. H01J 37/00; G01B 5/28
[52] U.S. Cl. .......................... 250/306; 250/307; 73/105
[58] Field of Search .................................. 250/306, 307; 73/105

[56] References Cited

U.S. PATENT DOCUMENTS 5,808,302  9/1998  Binnig et al. ........................... 250/306

*Primary Examiner*—Edward P. Westin
*Assistant Examiner*—Nikita Wells
*Attorney, Agent, or Firm*—Adams & Wilks

[57] ABSTRACT

A spindle scans a scanner unit comprising a slender tube portion, a thick tube portion and the like in x and y directions by receiving power from a movable member of a voice coil motor. A mechanical zoom switch is provided with a metal having a low melting point at inside thereof and connects a spring for zoom to the spindle when the metal is solidified. Therefore, the spring constant of the spring for zoom is added to the spring constant of the slender tube portion whereby zoom operation is caused. Meanwhile, when heat is applied from a heating coil to the switch, the metal having a low melting point is softened and the spring for zoom is separated from the spindle. Since the metal having a low melting point is used for the switch, the switch can be switched swiftly and the operational performance of the zoom mechanism is improved.

8 Claims, 6 Drawing Sheets

PROBE SCANNING DEVICE

BACKGROUND OF THE INVENTION

The present invention relates to a probe scanning device of a scanning type probe microscope or the like, particularly to a probe scanning device provided with a zoom function having excellent operational performance and capable of observing a surface of a sample with high accuracy without being influenced by heat or the like.

The applicant previously invented a probe scanning device having a zoom function as shown by FIG. 9 and applied for a patent (Japanese Patent Application No. Hei. 8-118015). A brief explanation will be given of the constitution and the operation of the probe scanning device as follows.

The first voice coil motor comprising a magnet 2 having a spindle portion 3, a movable member 4 wound with a coil 6 at its surrounding and a membrane 5, is attached to an upper inner portion of the cabinet 1. Further, the spindle 8 extending in z direction is fixed to the movable member 4. A displacement detector 9 is mounted to a lower end of the spindle 8 and a cantilever and a probe (tip) 10 are mounted to the displacement detector 9.

Meanwhile, the cabinet 1 is provided with a slender portion 14 projected to a sample chamber and a thick tube portion 15 connected thereto and an intermediate cylinder 13 is supported by the inner side of the thick tube portion 15 via a viscous body 17. Further, the spindle 8 is elastically supported by the first and the second spring 11 and 12 held by the intermediate cylinder. Electricity is conducted to a heating coil 16 to soften the viscous body 17 in coarse adjustment of the probe 10 in z direction.

Further, the second voice coil motor comprising a magnet 21 having a spindle portion 22, a movable member 23 wound with a coil 25 at its surroundings and a membrane 24, is attached to a side inner portion of the cabinet 1. A spindle 27 extending in x direction is attached to the movable member 23 and an open end of the spindle 27 is fixed to a portion 15a of the thick tube portion 15 via a slender wire 26. Further, although not illustrated, the third voice coil motor is attached in a direction different from the direction of the second voice coil motor by 90° and similar to the above-described constitution and a slender wire and a spindle, both not illustrated, connect a movable member of the third voice coil motor and the thick tube portion 15. Further, by driving the second and the third voice coil motors, the probe 10 is scanned in x and y directions.

A sample base 31 is installed at a position opposed to the probe 10 and a sample 32 to be inspected or fabricated is mounted on the sample base 31. The sample base 31 is installed on a coarse adjustment x, y, and z stage 33.

A zooming device comprising a holder 34, a heating coil 35, a viscous body 36 put into the holder 34, a leaf spring 37 one end of which is fixed to the spindle 27 and other end of which is planted in the viscous body 36 and a clamp device 38, is installed at a vicinity of the magnet 21.

According to the zooming device, the viscous body 36 is softened by conducting electricity to the heating coil 35, the probe 10 is brought to above the location of the sample 32 by the above-described x and y scanning mechanism and thereafter, electricity conduction to the heating coil 35 is stopped by which the viscous body 36 is solidified. In this way, the spring constant of the leaf spring 37 is added to a synthesized lateral spring constant of the slender tube portion 14 and the thick tube portion 15 whereby the width of x scanning is restricted. Also in respect of y direction, the width of y scanning is restricted similarly by operating a zooming device, not illustrated, by which the zoom function can be realized. Incidentally, the details are described in the specification of patent application and an explanation thereof will be omitted.

However, there are following problems in the above-described device. (1) In operating the zoom function, electricity is conducted to the heating coil 35 whereby the viscous body 36 is softened, the probe 10 is brought to above the location of the sample 32 and thereafter, the electricity conduction to the heating coil 35 is stopped whereby the viscous body 36 is solidified. Therefore, a time period for softening the viscous body 36 by conducting electricity to the heating coil 35 and a time period required for solidifying the viscous body 36 by stopping electricity conduction to the heating coil 35, are considerable and the zooming operation cannot be carried out swiftly. (2) At normal time where the zoom function is not used, the viscous body 36 is softened by conducting electricity to the heating coil 35. At this moment, heat generated at the heating coil 35 is transferred to the scanner unit comprising the slender tube portion 14, the thick tube portion 15 and the like via the leaf spring 37 and the spindle 27 and members constituting the scanner unit are thermally expanded. Therefore, the probe 10 is moved and a distortion is caused in the detected image of the sample 32.

It is an object of the present invention to provide a probe scanning device eliminating the above-described problems of the conventional technology, having excellent operational performance and causing no distortion in a detected image of a sample.

SUMMARY OF THE INVENTION

In order to achieve the above-described object, according to the present invention, the first feature provides a probe scanning device having the transmitting power from voice coil motors arranged at least in x and y directions to a scanner unit via a spindle, including switching means using a metal having a low melting point for selectively connecting an elastic member to the spindle wherein a zooming operation is performed by connecting the elastic member to the spindle by the switching means. The second feature resides in that the switching means is constituted by a cylindrical member provided with a heating member at its outer periphery and the metal having a low melting point filled in the cylindrical member. Further, the third feature resides in that in a probe scanning device having the transmitting power from voice coil motors arranged at least in x and y directions to a scanner unit including a slender tube portion and a thick tube portion via a spindle, comprising an elastic cylindrical tube arranged coaxially with the slender tube portion and the switching means for selectively connecting the cylindrical tube to the thick tube portion wherein a zooming operation is carried out by connecting the cylindrical tube to the thick tube portion by the switching means.

According to the present invention, the switching means in use of the metal having a low melting point is utilized and therefore, a temperature for changing the metal having a low melting point from a solidified state to a softened state, is low and therefore, an amount of heat required for switching the switching means is reduced. Therefore, the switching means can be switched quickly and a zoom mechanism can provide excellent operational performance. Further, the amount of heat required for switching the switching means is small and therefore, adverse effect can be prevented from effecting on the scanner unit by conducting the heat to the scanner unit.

DETAILED DESCRIPTION OF THE INVENTION

Figure 1:
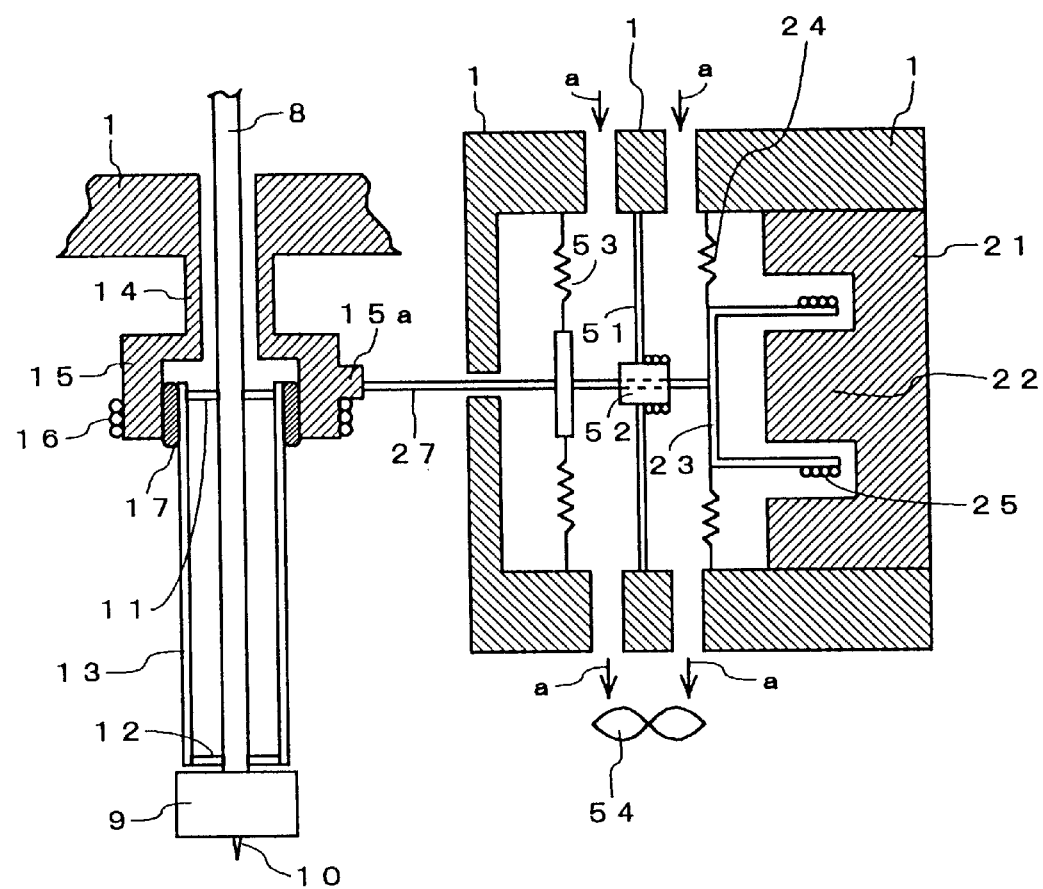
FIG. 1 is a sectional view of the essential portion of the first embodiment of the present invention.
Figure 9:
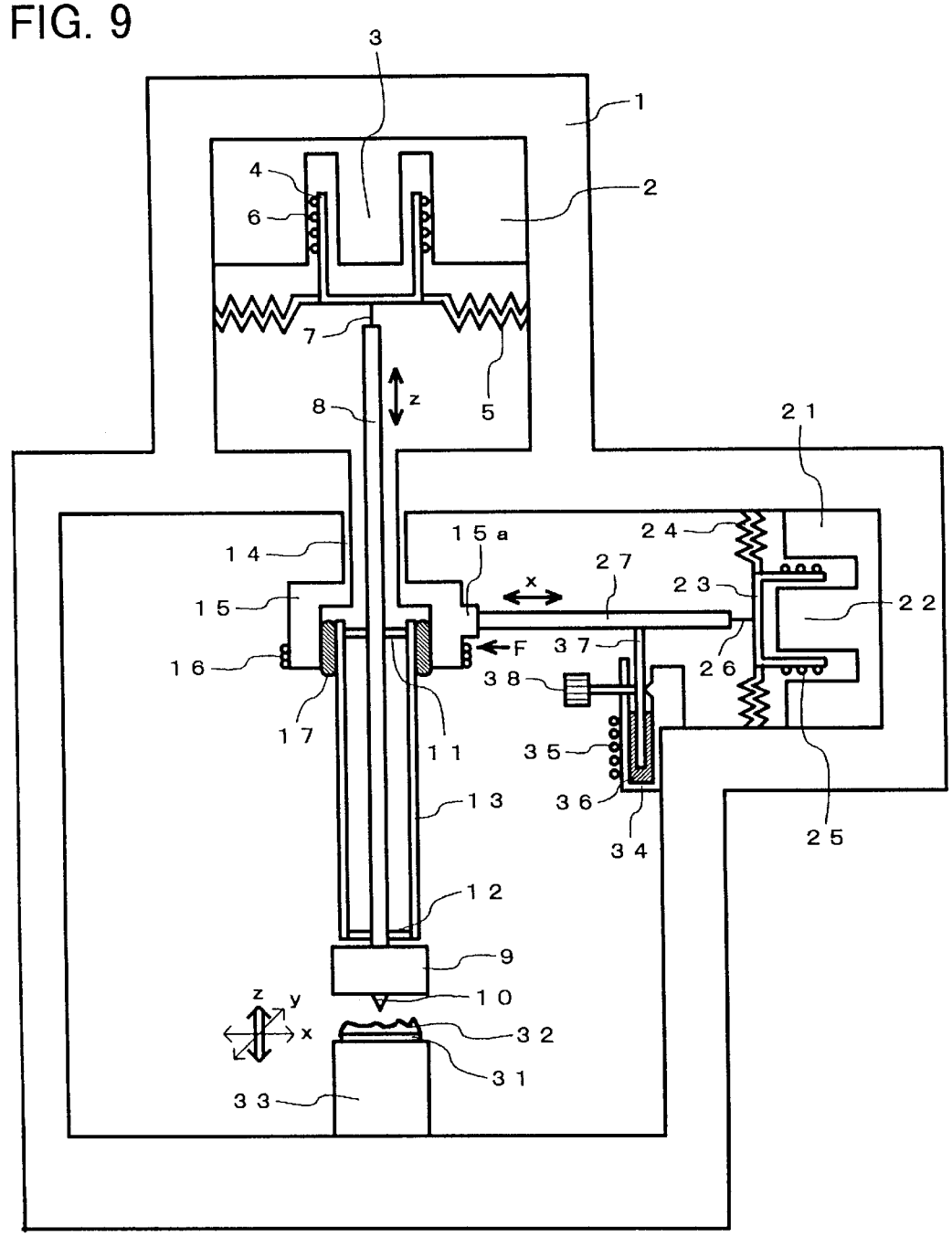
FIG. 9 is a sectional view showing an example of a probe scanning device which is the subject of Japanese Patent Application No. Hei. 9-118015.

A detailed explanation will be given of the present invention in reference to the drawings as follows. FIG. 1 shows a sectional view of essential portions according to an embodiment of the present invention. A zoom mechanism of this embodiment is incorporated in a cabinet 1 or a voice coil box formed by members different from those of the cabinet 1 and is constituted by a spring for zoom 51, a mechanical zoom switch 52 and a parallel spring 53. Numeral 54 designates a fan for operating to generate an air flow "a" passing through holes formed at the voice coil box. Further, other notations designate the same or equivalent members in FIG. 9.

Figure 2:
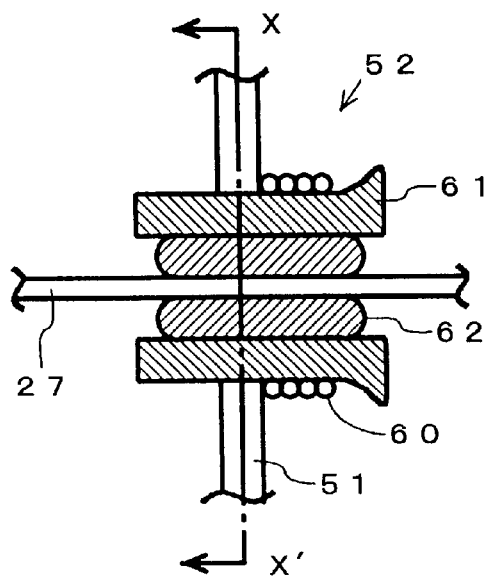
FIG. 2 is a sectional view of an example of a mechanical zoom switch of FIG. 1.
Figure 3:
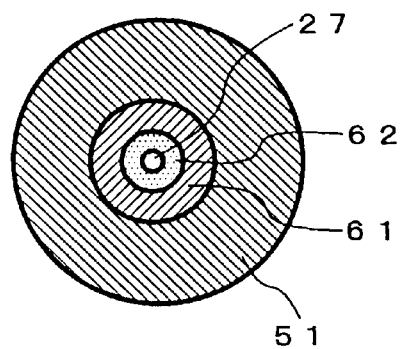
FIG. 3 is a sectional view taken from a line X-X' of FIG. 2.

Next, an explanation will be given of a specific example of the mechanical zoom switch 52 in reference to FIG. 2 and FIG. 3. FIG. 2 is a sectional view of the mechanical zoom switch 52 taken from a face including the spindle 27 and FIG. 3 is a sectional view taken from a line X-X' in FIG. 2. As illustrated, the mechanical zoom switch 52 comprises a cylindrical member 61 wound with a heating coil 60 at a portion of an outer periphery thereof and a metal 62 having a low melting point filled therein. The spring for zoom 51 can be made of, for example, stainless steel (e.g., SUS) and the spindle 27 can be made of a material having a low thermal expansion coefficient of, for example, INVAR or the like. Although according to the illustrated example, the spring for zoom 51 is in a disk shape, it may have a cross shape or other shape.

Figure 4:
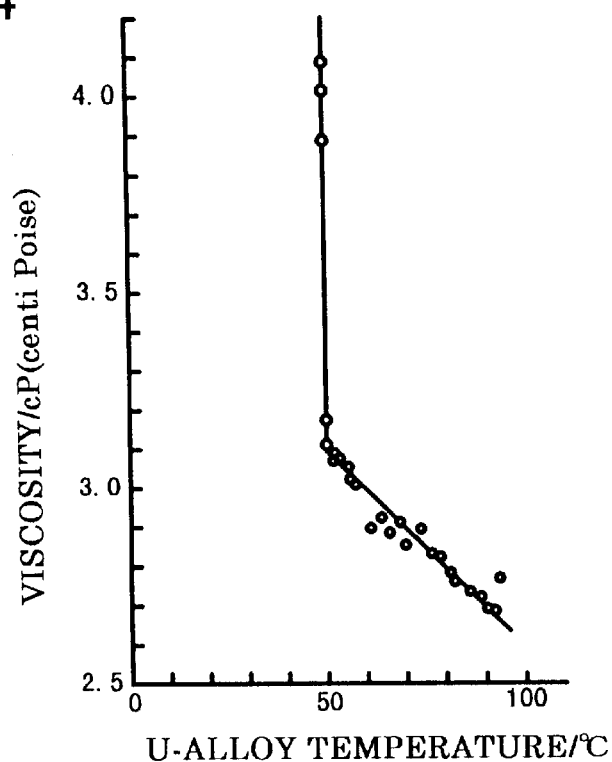
FIG. 4 is a diagram showing the viscous characteristic of a metal having a low melting point (u alloy).

Further, the cylindrical member 61 can be made of aluminum, brass or the like, and Wood's metal (e.g., U ALLOY manufactured by OSAKA ASASHI METAL MFG. CO., LTD. in Japan) or the like, may be used for the metal 62, having a low melting point. FIG. 4 is a diagram showing an example of the viscous characteristic of U ALLOY where temperature is designated by the abscissa and the viscosity is designated by the ordinate. As apparent from FIG. 4, it is known that the viscosity of u alloy having a certain composition significantly changes at about 55° C. as a boundary. That is, it is known that the alloy stays solidified up to about 55° C. and is rapidly softened by exceeding thus temperature. According to the above description, an explanation has been given of the zoom mechanism in x direction, a similar zoom mechanism is naturally provided also in y direction.

Next, an explanation will be given of the operation of the embodiment. When the zoom mechanism of the embodiment is not used, electricity is conducted to the heating coil 60 and the metal 62 having a low melting point is set to a temperature slightly exceeding about 55° C. Then, the metal 62 having a low melting point is softened, the spindle 27 is separated from the spring for zoom 51 and accordingly, the spindle 27 can be operated in a normal state with no zooming operation.

Now, assume that the spring constant of the slender tube portion 14 and the thick tube portion 15 is designated by notation k1, forces in x and y directions applied to the thick tube portion 15 are respectively designated by notations Fx and Fy and a lever magnification rate is designated by notation . Then, widths of scanning in x and y directions x1 and y1 are specified as follows.

$$x1=\beta \cdot Fx/k1$$

$$y1=\beta \cdot Fy/k1$$

Further, at this moment, the fan 54 is operated and accordingly, the air flow "a" is caused and the spindle 27 is cooled. Accordingly, even when the probe scanning device is used for a long period of time under this state, heat generated at the heating coil 60 can be prevented from being transferred to the scanner unit of the thick tube portion 15 and effecting adverse influence as less as possible. Meanwhile, when the zoom mechanism is used, firstly, electricity is conducted to the heating coil 60 by which the metal 62 having a low melting point is heated to the above-described temperature and is softened. Next, the probe 10 is brought to the position of inspecting the sample by the x and y scanning mechanism and thereafter, electricity conduction to the heating coil 60 is stopped whereby the metal 62 having a low melting point is solidified. In this way, the switch 52 is switched only by rising or falling the temperature above and below about 55° C. that is a fixed temperature and therefore, operation of switching the switch 52 is performed swiftly. Accordingly, the spindle 27 can be connected to the spring for zoom 51 in a short period of time and the operational performance is extremely improved.

When the spring constant of the spring for zoom 51 is designated by notation k2, the widths of scanning in x and y directions x2 and y2 in this case are specified as follows.

$$x2=\beta \cdot Fx/(k1+k2)$$

$$y2=\beta \cdot Fy/(k1+k2)$$

For example, when the spring constant k2 of the spring for zoom 51 is 9 times as large as the spring constant k1 (k2=9k1), x2=x1·1/10 and y2=y1·1/10 can be rendered and a 10 times zooming operation can be realized.

Next, an explanation will be given of a method of accurately carrying the probe 10 to above a location of the sample for zoom observation. In order to accurately carry the probe 10 to above the location of the sample for zoom observation, the following property of the zoom mechanism must be grasped.

Figure 5A:
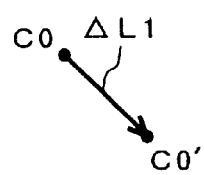
FIGS. 5A and 5B are explanatory views of feature of operation of the embodiment.

First, when the zoom mechanism is operated, the original point indicated by the probe 10 is moved. Assume that the original point of the device indicated by the probe 10 is disposed at position C0 shown by FIG. 5A when the metal 62 having a low melting point of the switch 52 is solidified. In this case, when the metal 62 having a low melting point is softened by conducting electricity to the heating coil 60 of the zoom mechanism in order to operate the zoom mechanism, the probe 10 is shifted by ΔL1 by the softening operation and is moved to position C0'. That is, the original point is C0' when the metal 62 having a low melting point is softened. Contrary thereto, when the metal 62 having a low melting point is softened and is solidified thereafter, the position of the probe 10 returns from C0' to C0.

Figure 5B:
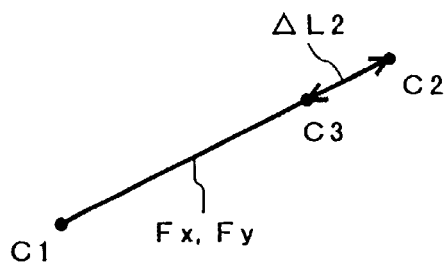

Secondly, when the spindle is applied with forces Fx and Fy in x and y directions to bring the probe 10 to a location of the sample for zoom observation and thereafter, the metal 62 having a low melting point is solidified and the forces Fx and Fy are brought to 0, the zoom mechanism has a property where the probe 10 returns toward the original point by a small amount from the position where the probe 10 is applied with the forces Fx and Fy. For example, as shown by FIG. 5B, when the spindle is applied with the forces Fx and Fy in x and y directions, the probe 10 is carried to position C2, and the forces Fx and Fy are made to 0 by solidifying the metal 62 having a low melting point, then, the probe 10 returns by ΔL2 and is disposed at position C3.

Figure 6:
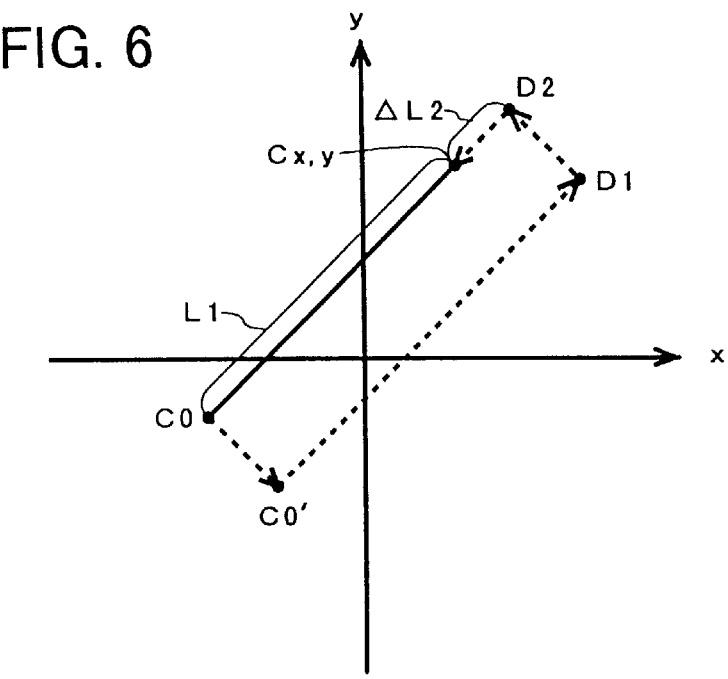
FIG. 6 is an explanatory view of a method of adjusting zoom position.

FIG. 6 illustrates a method of carrying the probe 10 to a position of starting the zooming operation in consideration of the above-described two properties. Now, assuming that the original point at an initial state of the probe scanning device is designated by notation C0 and a target of a zoom starting position is designated by Cx,y, when an operator softens the metal 62 having a low melting point by conducting electricity to the heating coil 60, the probe 10 is disposed at position C0'. Here, the operator moves the probe 10 in a direction of connecting the original point C0 and Cx,y by a distance L1 between the original point C0 and Cx,y added with a distance ΔL2 of returning the probe 10 when the forces Fx and Fy are made to 0. That is, the probe 10 is operated to dispose to position D1, illustrated in FIG. 6, the metal 62 having a low melting point is solidified by cutting electricity conduction to the heating coil 60 and the forces Fx and Fy applied to the spindle 27 are made to 0. Then, the probe 10 is moved from position D1 to position D2 as shown by a dotted line when the metal 62 having a low melting point is solidified and the probe 10 is carried from position D2 to the target position Cx,y when the forces Fx and Fy are made to 0.

As is apparent from the above explanation, according to the embodiment, the metal having a low melting point rapidly changing from a solidified state to a softened state or vice versa with a certain low temperature as a boundary is used in the zoom mechanism and therefore, the metal having a low melting point is softened in a short period of time when electricity conduction is started in the heating coil 60. Further, the switching of the metal having a low melting point from a solidified state to a softened state is rapid and therefore, the heating temperature at the heating coil 60 may exceed the softening start temperature (about 55° C.) only by a small amount. Therefore, when electricity conduction to the heating coil 60 is stopped, the temperature of the metal having a low melting point is lowered at or below the softening start temperature in a short period of time whereby the metal having a low melting point can be switched from a softened state to a solidified state. As a result, the zooming operation can be carried out swiftly. Further, at this moment, the fan 54 also contributes to cooling of the metal having a low melting point.

Further, according to the embodiment, the heating temperature by the heating coil 60 is low, the fan 54 is operated and the spindle 27 is formed by a material having a low thermal expansion coefficient and accordingly, heat generated by the heating coil 60 does not thermally expand the spindle 27. Therefore, the scanner unit comprising the slender tube portion 14, the thick tube portion 15 and the like is not influenced by heat generated by the heating coil 60. As a result, distortion can be prevented from causing in the detected image of the sample 32 by moving the probe 10.

Figure 7:
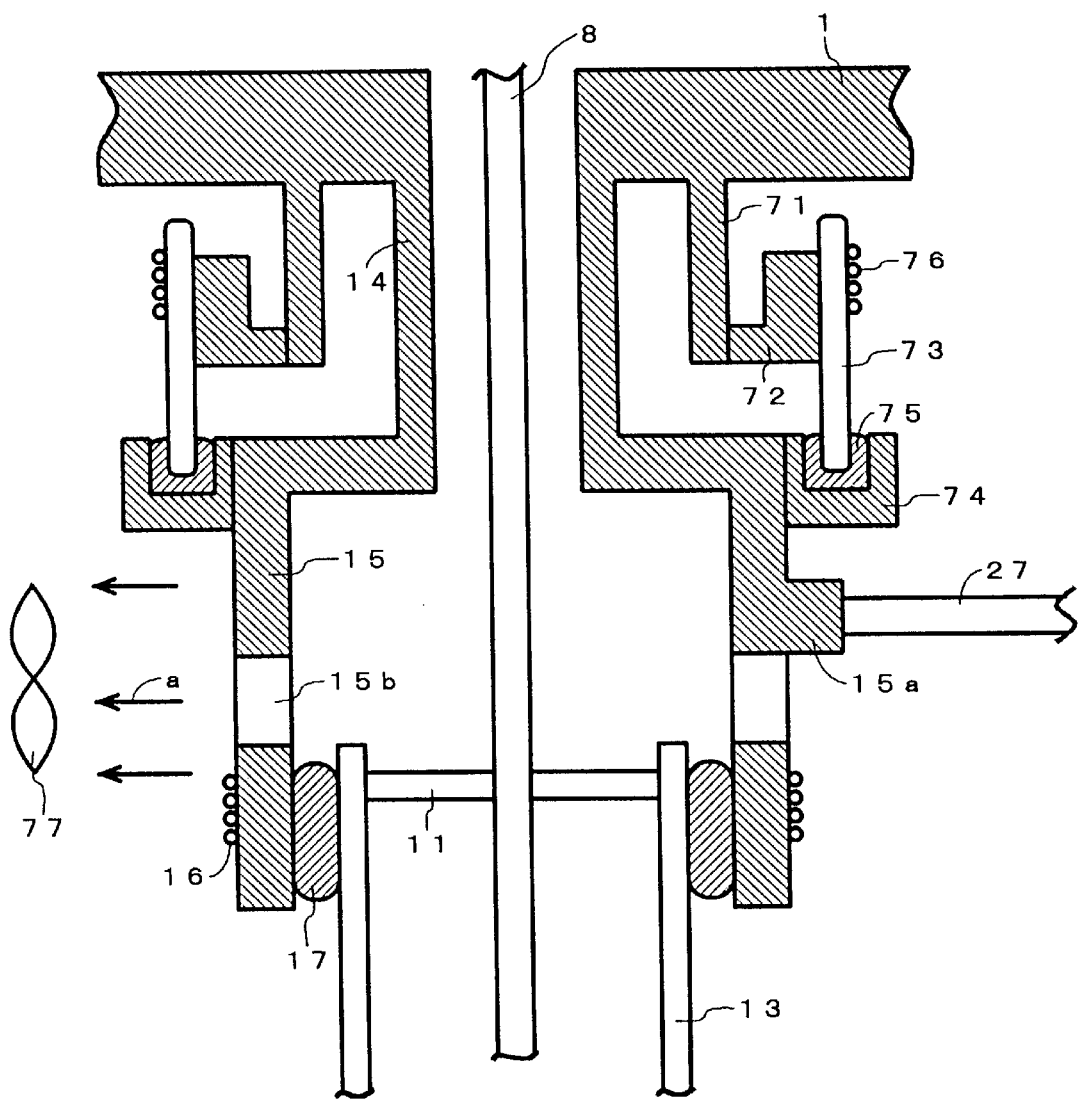
FIG. 7 is a sectional view of the essential portion of the second embodiment, of the present invention.

Next, an explanation will be given of other embodiment of the present invention in reference to FIG. 7. According to the embodiment, a cylindrical tube 71 constituted integrally and coaxially with the cabinet 1 is provided at the external side of the slender tube portion 14 and at a further external side, a single or a plurality of thermal conduction rods 73 are attached via an insulating member 72 formed by ceramics or the like. Further, the thermal conduction rods 73 may be of a ring-like shape. A holder 74 formed by an insulating member of ceramics or the like is fixed at an external side of the thick tube portion 15 and a metal 75 having a low melting point (for example, Cu alloy) is incorporated in the holder 74. A heating coil 76 is wound at an end portion of each of the thermal conduction rods 73 on the side of the insulating member 72 and the other end portion is inserted into the holder 74. Numeral 77 designates a fan which cools the thick tube portion 15 by generating an air flow "a" passing through holes 15b. Incidentally, notations other than the above-described designate the same or the equivalent members as in FIG. 9.

Next, an explanation will be given of the operation of the embodiment. When the zoom mechanism is not used, electricity is conducted to the heating coil 76 by which heat is supplied to the metal 75 having a low melting point via the thermal conduction rods 73. Thereby, the metal 75 having a low melting point in the holder 74 is softened, the cylindrical tube 71 is brought into a state of being separated from the thick tube portion 15 and the scanner unit comprising the slender tube portion 14, the thick tube portion 15 and the like performs a normal operation. Incidentally, at this moment, the fan 77 is operated, and therefore, heat of the metal 75 having a low melting point can be prevented from transferring to the scanner unit via the hole 74 as less as possible. When the zoom mechanism is used, electricity conduction to the heating coil 76 is stopped and heating of the metal 75 having a low melting point is stopped. Thereby, the metal 75 having a low melting point is solidified and the cylindrical tube 71 is connected to the thick tube portion 15. When x and y scanning is performed by the spindle 27 in x and y directions under this state, the widths of scanning in x and y directions x3 and y3 are specified as follows.

$$x3 = \beta \cdot Fx/(k1+k3)$$

$$y3 = \beta \cdot Fy/(k1+k3)$$

where k3 designates the spring constant of the cylindrical tube 71.

According to the embodiment, the metal 75 having a low melting point is incorporated in the holder 74 and therefore, the solidification of the metal 75 having a low melting point and switching between a solidified state and a softened state can be carried out in a short period of time and the zooming operation can be carried out swiftly. Further, heat generated at the heating coil 76 is transferred to the scanner unit only via the thermal conduction rods 73, in other words, heat in the heat generated at the heating coil 76 that is unnecessary and does not contribute to heating the metal 75 having a low melting point, is not transferred at all to the side of the scanner unit and therefore, heat transferred to the scanner unit can be restrained as less as possible. Further, the scanner unit is always cooled by the fan 77. Therefore, the scanner unit is not expanded by receiving influence of heat or the viscous body 17 is not softened by the heat.

Figure 8:
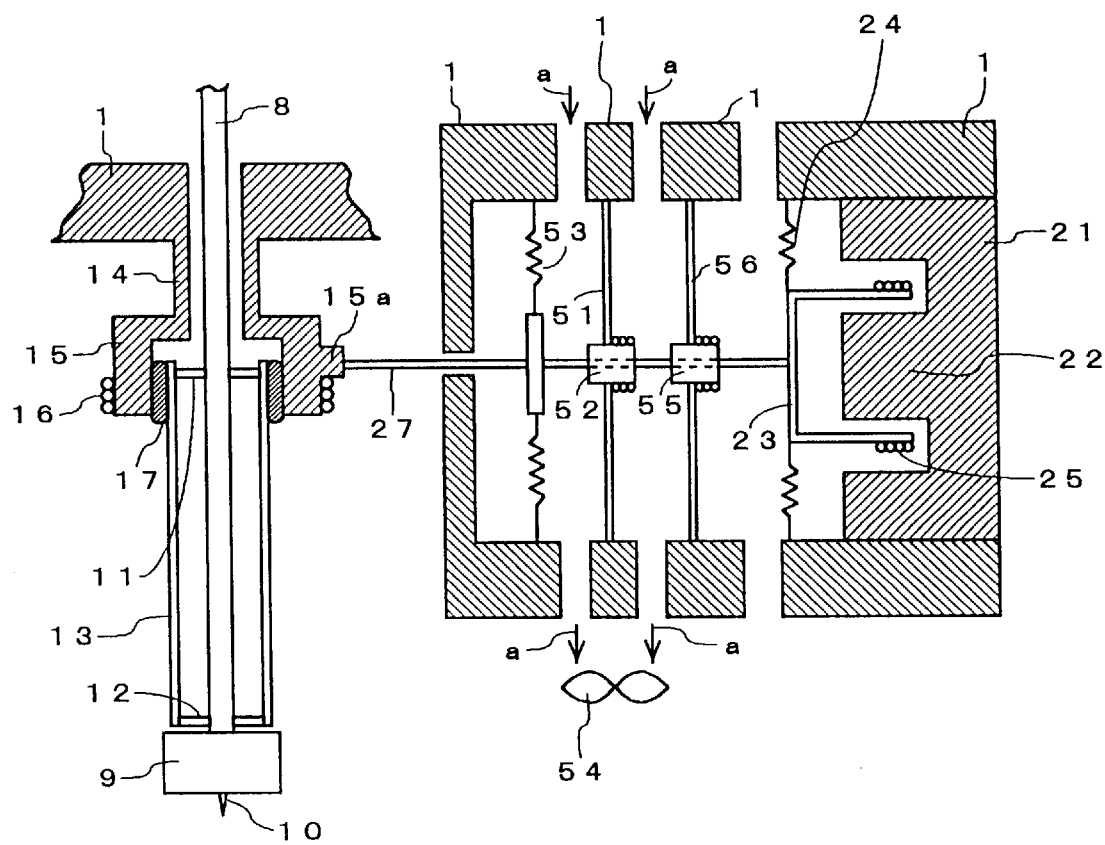
FIG. 8 is a sectional view of the essential portion of the third embodiment of the present invention.

Next, an explanation will be given of the third embodiment of the present invention in reference to FIG. 8. The feature of the embodiment resides in that the second mechanical zoom switch 55 is added to the constitution of FIG. 1. When the second mechanical zoom switch 55 is operated in parallel with the first mechanical zoom switch 55, the magnification of zoom can significantly be increased.

For example, assume that the spring constant of the slender tube portion 14 and the thick tube portion 15 is k1=k, the spring constant of the spring for zoom 51 is k2=9k and the spring constant of a spring for zoom 56 is k3=90k. Then, the widths of scanning in x and y directions x4 and y4 are specified as below by which 100 times zoom can be realized.

$$x4=\beta \cdot Fx/(k1+k2+k3)=\beta \cdot Fx/100k$$

$$y4=\beta \cdot Fy/(k1+k2+k3)=\beta \cdot Fy/100k$$

Incidentally, according to the embodiment, although the second mechanical zoom switch 55 is added, a third and a fourth mechanical zoom switch may further be added. Further, according to other embodiment of the present invention, both of the zoom mechanism of FIG. 1 or FIG. 8 and the zoom mechanism of FIG. 7 may be used.

According to the embodiment, since the switching means using the metal having a low melting point is used, the switching means can be made ON and OFF by supplying a small amount of heat thereto and cooling it. Therefore, the switching of the switching means can swiftly be carried out and the zoom mechanism having excellent operational performance can be provided. Further, the amount of heat required for switching the switching means is small and therefore, the scanner unit can be prevented from receiving adverse influence by conducting heat used in the switching means to the scanner unit. Accordingly, a probe scanning device having highly reliable zoom mechanism can be provided.

What is claimed is:

1. A probe scanning device in which power from voice coil motors arranged at least in an x direction and a y direction is transmitted to a scanner unit via a spindle, the probe scanning device comprising: switching means including a metal having a low melting point for selectively connecting an elastic member to the spindle to carry out a zooming operation.

2. A probe scanning device according to claim 1; wherein a plurality of the switching means are installed in parallel.

3. A probe scanning device according to claim 1; wherein the switching means comprises a cylindrical members a heating member disposed at an outer periphery of the cylindrical member, and the metal having a low melting point disposed in the cylindrical member; and wherein the spindle extends through the metal having a low melting point.

4. A probe scanning device according to claim 1; wherein the spindle is comprised of a material having a low thermal expansion coefficient.

5. A probe scanning device according to claim 1; further comprising blowing means for preventing heat generated at the switching means from being transmitted to a scanner unit.

6. A probe scanning device in which power from voice coil motors arranged at least in an x direction and a y direction is transmitted to a scanner unit including a slender tube portion and a thick tube portion via a spindle, the probe scanning device comprising: an elastic cylindrical tube arranged coaxially with the slender tube portion; and switching means for selectively connecting the elastic cylindrical tube to the thick tube portion to carry out a zooming operation.

7. A probe scanning device according to claim 6; wherein the switching means comprises a heat conducting member provided with a heating member at an outer periphery thereof and attached to the slender tube portion via a first heat insulating member a second heat insulating member having a recess for receiving a portion of the heat conducting member, and a metal having a low melting point disposed in the recess of the second heat insulating member.

8. A probe scanning device according to claim 6; further comprising blowing means for preventing heat generated at the switching means from being transmitted to a scanner unit.

* * * * *